(12) United States Patent
Usami et al.

(10) Patent No.: US 6,341,122 B1
(45) Date of Patent: Jan. 22, 2002

(54) OPTICAL INFORMATION RECORDING MEDIUM

(75) Inventors: Yoshihisa Usami; Michihiro Shibata; Noboru Komori; Toshio Ishida, all of Odawara; Takashi Morohashi, Hamura, all of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/525,479

(22) Filed: Mar. 15, 2000

(30) Foreign Application Priority Data

Mar. 15, 1999 (JP) .......................................... 11-068586
Mar. 15, 1999 (JP) .......................................... 11-068587

(51) Int. Cl.$^7$ ................................................ G11B 7/24
(52) U.S. Cl. .................................... 369/275.4; 428/64.4
(58) Field of Search .......................... 369/275.4, 275.2, 369/275.1; 428/64.4, 64.3, 64.2, 64.1; 430/320, 321

(56) References Cited

U.S. PATENT DOCUMENTS

| | | | | |
|---|---|---|---|---|
| 5,080,946 A | * | 1/1992 | Takagisi et al. .......... | 369/275.4 |
| 5,216,665 A | * | 6/1993 | Imataki ..................... | 369/279 |
| 5,406,546 A | * | 4/1995 | Uchiyama et al. ....... | 369/275.4 |
| 5,976,657 A | * | 11/1999 | Min et al. .................... | 8/64.1 |
| 6,004,646 A | * | 12/1999 | Ohno et al. ................ | 428/64.1 |
| 6,128,273 A | * | 10/2000 | Horie et al. .............. | 369/275.4 |
| 6,169,721 B1 | * | 1/2001 | Takishita et al. ........ | 369/275.4 |

FOREIGN PATENT DOCUMENTS

| JP | 7320304 | * | 12/1995 | .............. 369/275.4 |
|---|---|---|---|---|
| JP | 2000-268412 | * | 9/2000 | .............. 369/275.4 |

* cited by examiner

Primary Examiner—Tan Dinh
(74) Attorney, Agent, or Firm—Sughrue Mion, PLLC

(57) ABSTRACT

An optical information recording disc such as CD-R or DVD-R is composed of a transparent disc substrate provided with a spiral pregroove, a recording dye layer, placed in the pregroove, and a light-reflecting layer, wherein the pregroove formed in the area between an inner circle having a radius corresponding a half of a radius of the disc substrate and an outer circle having a radius corresponding 19/20 of the radius of the disc substrate has a radiused top corner at least one side, under the condition that the radius of the radiused corner on the outer circle is more generous than the radius of the radiused corner on the inner circle.

17 Claims, 2 Drawing Sheets

OPTICAL INFORMATION RECORDING MEDIUM

FIELD OF THE INVENTION

This invention relates to an optical information recording medium such as a recordable compact disc (namely, CD-R) or a recordable digital video disc (namely, DVD-R).

BACKGROUND OF THE INVENTION

An optical information recording medium on which information can be only once recorded by means of a laser beam (i.e., an optical disc of write-once type) is known as a recordable compact disc (CD-R), and is widely used in practice. The optical disc of CD-R type generally has a multi-layered structure typically comprising a disc-shaped transparent substrate (support), a recording layer comprising an organic dye (often referred to as "recording dye layer"), a light-reflecting layer comprising a metal (hereinafter, often referred to as simply "reflecting layer"), and optionally a protective layer made of resin overlaid in order.

Large recording capacity is often needed in recent days, but an optical disc of CD-R type does not always have fully satisfactory large information-recording capacity. Therefore, an optical disc having satisfactory large information-recording capacity has been desired and proposed. For example, a recordable DVD (i.e., recordable digital video disc, DVD-R), which information can be recorded on and read out from by means of a laser beam having a shorter wavelength than that for CD-R, has been proposed. The optical disc of DVD-R type is formed by laminating two composites having a layered structure.

Each of the layered composites comprises a transparent disc substrate provided with a guide groove (i.e., pregroove) for tracking of the laser beam, a recording layer comprising an organic dye, a light-reflecting layer, and a protective layer arranged in order. The layered composites are combined with an adhesive so that the recording layers would be placed inside. The pregroove on the substrate of DVD-R generally has a width of 0.74 to 0.8 $\mu$m, which is less than a half of the width of the pregroove on a substrate of CD-R. Otherwise, the optical disc of DVD-R type is formed by combining a protective disc plate and the layered composites comprising a substrate, a recording layer, a light-reflecting layer and a protective layer arranged in order.

For writing (i.e., recording) and reading (i.e., reproducing) the information, a CD-R is irradiated with a laser beam having a wavelength in the range of 770 to 790, typically approx. 780 nm, while a DVD-R is irradiated with a laser beam of visible wavelength region (generally having a wavelength of 600 to 700 nm). By the irradiation of the laser beam, irradiated area of the recording dye layer is locally heated to change its physical or chemical characteristics, and pits are formed in the irradiated area of the recording layer. Since the optical characteristics of the formed pits are different from those of the area having been not irradiated, the digital information is optically recorded. The recorded information can be read by a reproducing procedure generally comprising the steps of irradiating the recording layer with the laser beam having the same wavelength as that employed in the recording procedure, and detecting the light-reflection difference between the pits and their periphery.

Japanese Patent Provisional Publication No. 2-78038 describes an optical information recording disc of CD-R type whose substrate has a pregroove having a radiused bottom corner and a radiused top corner on its both sides. It is described that an optical disc having the substrate shows a high reflectance and ensures good tracking performance. The pregroove having the radiused corners is formed by coating an organic solvent on a molded substrate having a pregroove, so that the corners of the pregroove can be slightly dissolved in the solvent to give the radiused corners. Therefore, the top corners of the pregroove illustrated in the above publication have an equal radius on the substrate from its inner side to outer side.

It is known that a molded resinous substrate has warp particularly on its outer periphery. An optical recording disc using such warped substrate shows side- runout when the optical disc is rotated for recording an information or reading out the recorded information. Accordingly, a substrate has been so produced that the warp would be produced as small as possible. However, since an increased rotation rate of an optical disc for recording or reading out an increased amount of information within a short period has been adopted, the warp of the substrate is apt to cause trouble even if the warp is not large. Particularly, if the optical disc is rotated at a rate as much as twice or more, particularly four times or more of the standard rate, the side-runout on the outer periphery of the disc causes troubles such as increase of jitter values, resulting in production of error in the information read-out procedure. The trouble is supposed in one aspect to be caused that the side-runout of the disc in the recording procedure causes deformation of shapes of pits for the information recording. The substrate having a substrate in which the pregroove has the radiused top corners is relatively free from the deformation of pit shapes in the information recording procedure. However, it is desired to provide an optical information recording disc which is favorably employable in the information recording and reproducing procedures which are performed at an increased disc rotation rate.

Accordingly, it is an object of the present inventors to provide an optical information recording disc such as CD-R or DVD-R which is favorably employable in the information recording and reproducing procedures which are performed at an increased disc rotation rate.

SUMMARY OF THE INVENTION

It has been now discovered by the inventors that an optical information recording disc having a substrate on which a pregroove has a radiused (or rounded) top corner whose radius is more generous on the outer periphery of the disc than on the middle area of the disc is advantageous for obviating the errors produced on the information recording procedure and the information reproducing procedure. This is supposed that the formation of pits in the recording layer in the pregroove having a highly generous corner as well as read-out of the recorded information from the layer in the pregroove having a highly generous corner is less effected by the side-runout of the peripheral area of the recording disc.

Accordingly, the present invention resides in an optical information recording disc comprising a transparent disc substrate provided with a spiral pregroove, a recording dye layer placed in the pregroove on which information is recorded by irradiation with a laser beam, and a light-reflecting layer, arranged in order, wherein the pregroove formed in the area between an inner circle having a radius corresponding to a half of a radius of the disc substrate and an outer circle having a radius corresponding to 19/20 of the radius of the disc substrate has a radisued top corner at least one side, under the condition that the radius of the radiused corner on the outer circle is more generous than the radius of the radiused corner on the inner circle under the following conditions:

$$W1_{90}-W1_{50}<W2_{90}-W2_{50}$$

wherein $W1_{90}$ means a width of the pregroove on the inner circle which is measured at a depth of 10% of the depth of the pregroove and $W1_{90}$ means a half width of pregroove on the inner circle, while $W2_{90}$ means a width of the pregroove on the outer circle which is measured at a depth of 10% of the depth of the pregroove and $W2_{50}$ means a half width of the pregroove on the outer circle.

If there is formed no spiral pregroove on the outer circle, an outermost spiral pregroove (which is generally formed at 1 mm from the outer end of the substrate disc) is adopted in place of the pregroove on the outer circle.

The optical information recording disc of the invention is generally utilized as a recordable compact disc (CD-R) or a recordable digital video disc (DVD-R).

In the optical information recording disc of the invention, it is preferred that the radius of the radiused corner of the pregroove continuously increases from the pregroove on the inner circle to the pregroove on the outer circle.

Both of the pregroove on the inner circle and the pregroove on the outer circle preferably have a radiused corner on their both sides.

The CD-R of the invention is favorably employed in a method of recording information which comprises irradiating the CD-R with a laser beam having a wavelength of 770 to 790 nm.

The DVD-R of the invention is favorably employed in a method of recording information which comprises irradiating the DVD-R with a laser beam having a wavelength of 600 to 700 nm.

DETAILED DESCRIPTION OF THE INVENTION

The optical information recording disc (e.g., CD-R or DVD-R) of the invention comprises a transparent disc substrate provided with a spiral pregroove, a recording-dye layer on which information is recorded by irradiation with a laser beam, and a light-reflecting layer overlaid in order. The structures of the CD-R and DVD-R are already known.

Figure 1:
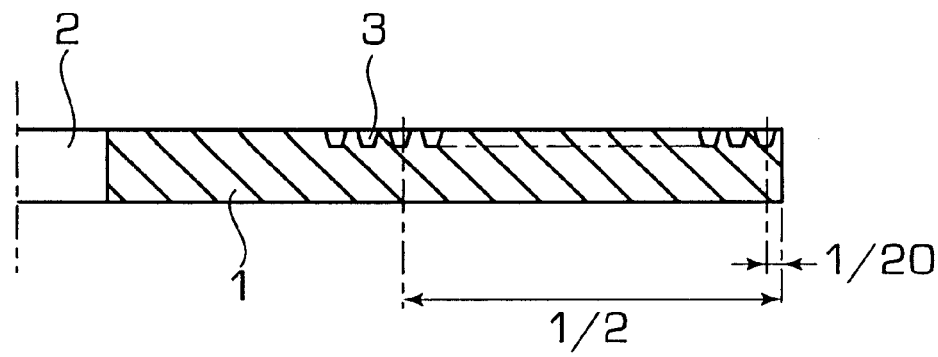
FIG. 1 illustrates a section of a pregroove-formed substrate of an optical information recording disc according to the invention.

FIG. 1 illustrates a section of a pregroove-formed substrate of an optical information recording disc 1, in which a center hole 2 and the spiral pregroove 3 are formed.

The spiral pregroove has a radiused top corner. The radiused top corner is preferably formed on the outer side. More preferably the radiused top corner is formed on both sides of the pregroove.

Figure 2A:
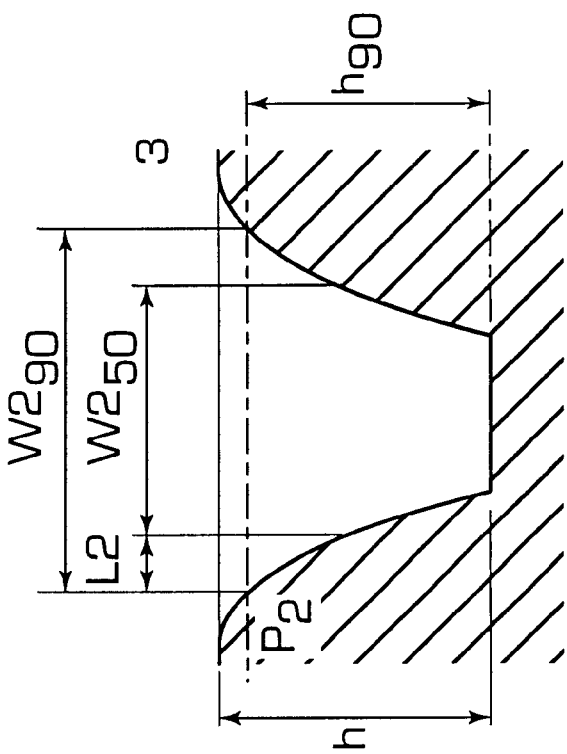
FIG. 2 illustrates an enlarged section of the pregroove preferably formed in the substrate of an optical information recording disc according to the invention.
Figure 2B:
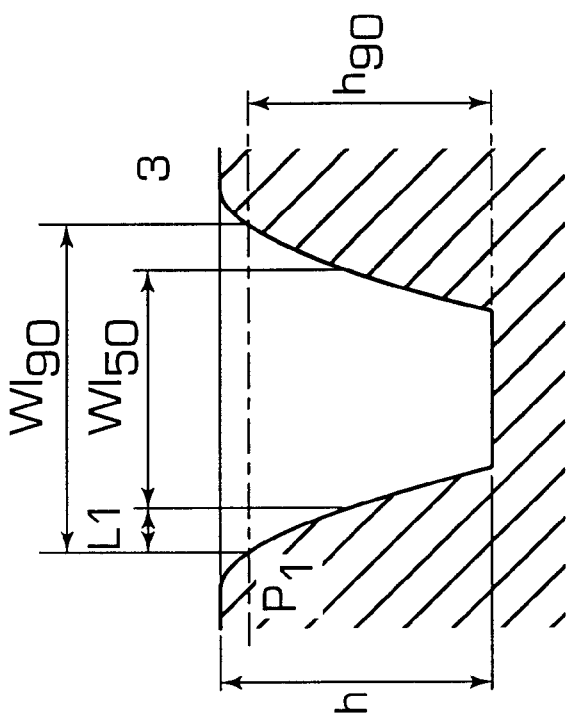

In FIG. 2, an enlarged section of the preferred pregroove is illustrated. FIG. 2-(a) gives an enlarged section of the pregroove P1 on the inner circle which has a radius corresponding to a half of the radius of the substrate disc. FIG. 2-(b) gives an enlarged section of the pregroove P2 on the outer circle which has a radius corresponding to nineteen-twentieth (19/20) of the radius of the substrate disc.

In FIG. 2, $W1_{90}$ means a width of the pregroove on the inner circle which is measured at a depth of 10% (i.e., $h-h_{90}$) of the depth (h) of the pregroove and $W1_{50}$ means a half width of the pregroove on the inner circle, while $W2_{90}$ means a width of the pregroove on the outer circle which is measured at a depth of 10% (i.e., $h-h_{90}$) of the depth (h) of the pregroove and $W2_{50}$ means a half width of the pregroove on the outer circle. L1 corresponds to $(W1_{90}-W1_{50})/2$, and L2 corresponds to $(W2_{90}-W2_{50})/2$.

When the optical information recording disc of the invention is utilized as CD-R, the following conditions are preferably adopted in its production:

(1) L1 which is defined by $(W1_{90}-W1_{50})/2$ is in the range of 50 to 120 nm, more preferably 60 to 110 nm, most preferably 70 to 100 nm.

(2) L2 which is defined by $(W2_{90}-W2_{50})/2$ is in the range of 60 to 130 nm, more preferably 70 to 120 nm, most preferably 80 to 110 nm.

(3) L1 and L2 satisfy the following condition:

$$L2-L1=3 \text{ to } 30 \text{ nm}$$

(more preferably 5 to 25 nm, most preferably 7 to 20 nm).

(4) The pregroove has a depth of 10 to 300 nm and a half width of 200 to 900 nm.

When the optical information recording disc of the invention is utilized as DVD-R, the following conditions are preferably adopted in its production:

(1) L1 which is defined by $(W1_{90}-W1_{50})/2$ is in the range of 10 to 100 nm, more preferably 20 to 90 nm, most preferably 30 to 80 nm.

(2) L2 which is defined by $(W2_{90}-W2_{50})/2$ is in the range of 20 to 110 nm, more preferably 30 to 100 nm, most preferably 40 to 90 nm.

(3) L1 and L2 satisfy the following condition:

$$L2-L1=3 \text{ to } 60 \text{ nm}$$

(more preferably 5 to 50 nm, most preferably 7 to 40 nm).

(4) The pregroove has a depth of 50 to 250 nm (more preferably 80 to 220 nm, most preferably 100 to 200 nm, specifically preferably 150 to 200 nm) and a half width of 100 to 450 nm (more preferably 150 to 400 nm, most preferably 200 to 350 nm).

Figure 3:
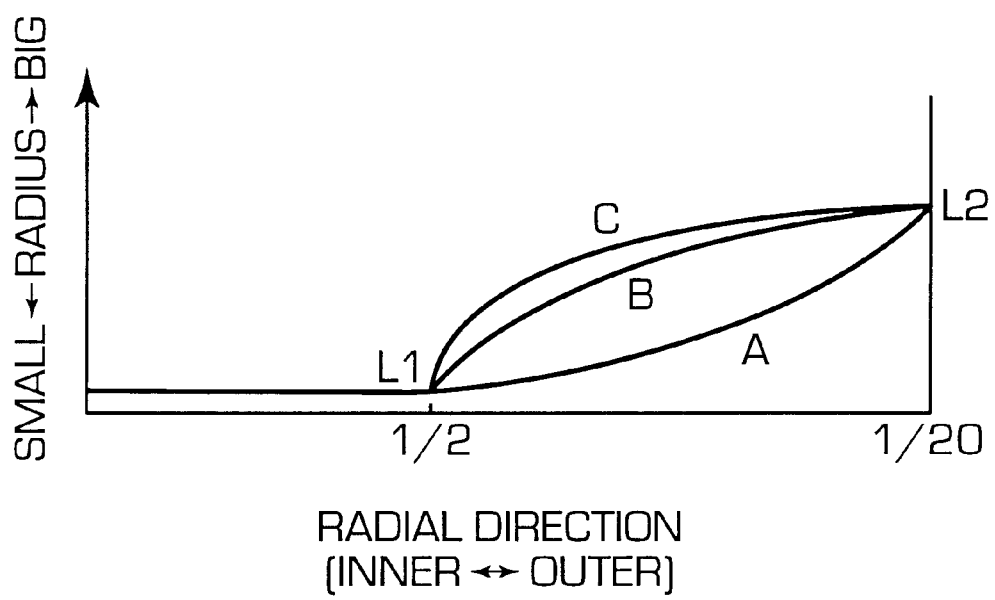
FIG. 3 indicates possible variation of the radius of the radiused top corner in the radial direction.

In both optical information recording media, namely, CD-R and DVD-R, variation of the radius of the radiused top corner can be expressed in FIG. 3. In any cases, the radius of the radiused corner of the pregroove continuously increases from the pregroove on the inner circle to the pregroove on the outer circle.

The optical information recording disc of the invention can be produced from the materials which have been conventionally used for producing a CD-R or a DVD-R. The DVD-R can be produced by combining, via an adhesive, two layered composites, each of which comprises a substrate, a recording dye layer, a light-reflecting layer, and if desired a protective layer arranged in order, so that the recording dye layers would be placed inside. Otherwise, the DVD-R can be also produce by combining, via an adhesive, the aforementioned layered composite and a disc protective plate having almost the same shape as the substrate.

The transparent substrate including the disc protective plate for the DVD-R (hereinafter, often referred to as "protective substrate") can be made of any of materials known as those for producing the substrate of the known optical information recording medium. Examples of the materials include glass, polycarbonate, acrylic resins such as polymethyl methacrylate, vinyl chloride resins such as polyvinyl chloride and vinyl chloride copolymer, epoxy resins, amorphous polyolefins, and polyesters. These materials can be employed in combination, if desired. The materials are molded to give a sheet or a rigid plate. Polycarbonate is most preferred from the viewpoints of humidity resistance, dimensional stability, and production cost.

A disc substrate for CD-R generally has a diameter of 120±3 mm and a thickness of 1.2±0.1 mm or has a diameter of 80±3 mm and a thickness of 1.2±0.1 mm.

A disc substrate for DVD-R generally has a diameter of 120±3 mm and a thickness of 0.6±0.1 nn or has a diameter of 80±3 mm and a thickness of 0.6±0.1 mm.

The substrate may have an undercoating layer on its surface of the recording layer side, so as to enhance surface smoothness and adhesion and to keep the recording dye layer from deterioration. Examples of the materials for the undercoating layer include polymers such as polymethyl methacrylate, acrylate-methacrylate copolymer, styrene-maleic anhydride copolymer, polyvinyl alcohol, N-methylolacrylamide, styrene-vinyltoluene copolymer, chloro-sulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, and polycarbonate, and surface treating agents such as a silane-coupling agent.

The undercoating layer can be formed by applying a coating solution (in which one or more of the above-mentioned materials are dissolved or dispersed) onto the surface of the substrate by the known coating methods such as spin-coat, dip-coat, and extrusion-coat. The undercoating layer generally has a thickness of 0.005 to 20 $\mu$m, preferably 0.01 to 10 $\mu$m.

On the surface of the substrate or on the undercoating layer, the specifically designed pregroove for tracking or giving address signals is formed. The pregroove is preferably formed directly on the surface of the substrate when the substrate is molded from polymer material by injection or extrusion. For instance, a stamper having a mold thereon corresponding to the radiused top corner can be employed for the preparation of the substrate of the optical information disc of the invention. Such stamper can be produced by processing a portion corresponding to the top corner of the pregroove of the substrate using a laser beam. Otherwise, the pregroove having the radiused top corner can be produced by adjusting the conditions (e.g., viscosity) of resin material (for preparing the substrate) on the stamper.

Alternatively, the pregroove can be provided on the surface of the substrate by placing a pregroove layer. The pregroove layer can be produced from a mixture of a monomer (such as monoester, diester, triester and tetraester) of acrylic acid (or its oligomer) and a photo-polymerization initiator. The pregroove layer can be produced by the steps of coating a precisely produced stamper with a mixture of the polymerization initiator and a monomer such as the above-mentioned acrylic ester, placing a substrate on the formed layer, and irradiating the formed layer with ultra-violet rays through the stamper or the substrate so as to cure the coated layer as well as to combine the cured layer and the substrate. The substrate to which the cured layer is attached is separated from the stamper, to give the desired substrate equipped with a pregroove layer. The thickness of the pregroove layer is generally in the range of 0.05 to 100 $\mu$m, preferably in the range of 0.1 to 50 $\mu$m.

For the CD-R, the pregroove formed on the substrate preferably has a depth of 10 to 300 nm and a half-width of 200 to 950 nm. A generally adopted track pitch can be also adopted to the CD-R of the invention.

For the DVD-R, the pregroove formed on the substrate preferably has a track pitch of 0.3 to 0.9 $\mu$m (more preferably 0.4 to 0.8 $\mu$m), a depth of 50 to 250 nm (more preferably 80 to 220 nm, further preferably 100 to 200 nm), and a half-width of 100 to 450 nm (more preferably 150 to 400 nm, further preferably 200 to 350 nm). A depth of 150 to 200 nm of the pregroove is preferably adopted because such pregroove can enhance the sensitivity without decreasing the light-reflection on the substrate. The optical disc having that pregroove shows a high sensitivity, and hence is employable even in a recording system using a laser beam of low power. This means that a semiconductor laser of low output power can be employed, and the life of semiconductor laser can be prolonged.

On the substrate provided with the pregroove, the recording dye layer is placed. The dye employed for the recording layer is not particularly restricted, but dyes having high absorption at a wavelength of the laser beam are preferred. Dyes employed for conventional optical information recording media are employable. Examples of the dyes include cyanine dyes, phthalocyanine dyes, imidazoquinoxaline dyes, pyrylium/thiopyrylium dyes, azulenium dyes, squarilium dyes, metal (e.g., Ni, Cr) complex dyes, naphthoquinone dyes, anthraquinone dyes, indophenol dyes, merocyanine dyes, oxonol dyes, naphthoaniline dyes, triphenylmethane dyes, triallylmethane dyes, aminium/diimmonium dyes, and nitroso compounds. Preferred are cyanine dyes, phthalocyanine dyes, azulenium dyes, squarilium dyes, oxonol dyes, and imidazoquinoxaline dyes. More preferred are cyanine dyes.

The recording dye layer generally has a thickness of 20 to 500 nm, preferably 50 to 300 nm.

The recording dye layer can be formed by the steps of dissolving the dye and, if desired an anti-fading agent and a binder in a solvent to prepare a coating liquid, applying the coating liquid onto the substrate provided with a pregroove to form a dye layer, and then drying the formed dye layer. Examples of the solvents employable for the coating liquid include esters such as butyl acetate and cellosolve acetate; ketones such as methyl ethyl ketone, cyclohexanone and methyl isobutyl ketone; chlorinated hydrocarbons such as dichloromethane, 1,2-dichloroethane and chloroform, amides such as dimethylformamide; hydrocarbons such as cyclohexanone; ethers such as tetrahydrofuran, diethyl ether and dioxane; alcohols such as ethanol, n-propanol, isopropanol, n-butanol, and diacetone alcohol; fluorine-containing solvents such as 2,2,3,3-tetrafluoropropanol, and glycol ethers such as ethyleneglycol monomethyl ether, ethyleneglycol monoethyl ether, and propyleneglycol monomethyl ether. These solvents may be employed singly or in combination, in consideration of the solubility of the used compounds in the solvent. The coating liquid can further include auxiliary additives such as an oxidation inhibitor, a UV absorber, a plasticizer, and a lubricant.

Examples of the anti-fading agents include nitroso compounds, metal complexes, diimmonium salts, and aluminum salts. These examples are described in, for example, Japanese Patent Provisional Publications No. 2-300288, No. 3-224793 and No. 4-146189. In the case that the anti-fading agent is added to the coating liquid, the amount of the agent is in the range of 0.1 to 50 wt. %, preferably 0.5 to 45 wt. %, more preferably 3 to 40 wt. %, further preferably 5 to 25 wt. %, based on the amount of the dye.

Examples of the binders include natural-origin polymers such as gelatin, cellulose derivatives, dextran, rosin, and rubber; hydrocarbon polymer resins such as polyurethane, polyethylene, polypropylene, polystyrene and polyisobutyrene, vinyl polymers such as polyvinyl chloride, polyvinylidene chloride, and vinyl chloride-vinyl acetate copolymer; acrylate polymers such as polymethyl acrylate and polymethyl methacrylate; polyvinyl alcohol, chlorinated polyethylene; epoxy resins; butyral resins, rubber derivatives, and thermosetting resins such as prepolymers of phenol-formaldehyde. The amount of the binder may be in the range of 0.2 to 20 weight parts (preferably 0.5 to 10 weight parts, further preferably 1 to 5 weight parts) based on 100 weight parts of the dye. The concentration of the dye in the coating liquid is generally in the range of 0.01 to 10 wt. %, preferably 0.1 to 5 wt. %.

The coating can be performed by the known methods such as spray coat, spin coat, dip coat, roller coat, blade coat, doctor roller coat and screen print. The recording dye layer can be a single layer or can comprise plural layers.

On the recording dye layer, the light-reflecting layer is placed so as to enhance the light-reflection in the course of reproduction of information.

The light-reflecting material to be used for the formation of the light-reflecting layer should show a high reflection to the laser light. Examples of the light-reflecting materials include metals and sub-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi. Stainless steel film is also employable. Preferred are Cr, Ni, Pt, Cu, Ag, Au, Al and stainless steel. These materials can be employed singly, in combination, or in the form of alloy.

The light-reflecting layer can be formed on the recording layer by, for example, vacuum deposition, sputtering or ion-plating. The thickness of the light-reflecting layer generally is 10 to 800 nm, preferably 20 to 500 nm, further preferably 50 to 300 nm.

On the light-reflecting layer, a protective layer may be provided so as to protect the recording layer and the light-reflecting layer from chemical deterioration or physical damage. In addition to the light-reflecting layer on the light-reflecting layer, another protective layer can be also placed on the substrate on the surface not having the recording dye layer so as to enhance the scratch resistance and the moisture resistance of the medium. The protective layer can be made of inorganic materials such as SiO, $SiO_2$, $MgF_2$, $SnO_2$, $Si_3N_4$, or organic materials such as thermoplastic resins, thermo-setting resins, and UV curable resins. On the light-reflecting layer and/or the substrate, the protective layer can be formed by laminating a film of plastic material with an adhesive. The inorganic material can be also placed on the light-reflecting layer and/or the substrate by vacuum deposition or sputtering. Otherwise, the organic polymer material layer can be formed by the steps of dissolving the polymer material in an appropriate solvent to prepare a coating solution, applying the coating solution to form a polymer material layer, and then drying the formed polymer material layer to give the protective layer. For example, a UV resin is dissolved in a solvent and applied onto the light-reflecting layer and/or the substrate, and then cured by applying ultraviolet rays to the formed resin layer. The protective layer can contain various additives such as an anti-static agent, an oxidation inhibitor and a ultraviolet absorber. The thickness of the protective layer generally is in the range of 0.1 to 100 μm.

Thus, the above-described process can give a layered composite comprising a substrate, a recording layer, a reflecting layer, and if desired a protective layer.

For producing a DVD-R according to the invention, two composites are produced and combined via an adhesive so that each recording layer would be placed inside. Thus produced DVD-R has two recording layers. On the other hand, the DVD-R of the invention having a single recording layer can be also produced by combining via an adhesive the composite and a disc protective plate having almost the same shape as the composite so that the recording layer would be placed inside. As the adhesive, the UV curable resins described above for the protective layer and synthetic adhesives can be used. Further, double-faced adhesive tape is also employable. The adhesive layer usually has a thickness of 0.1 to 100 μm (preferably, 5 to 80 μm). The DVD-R of the invention in any embodiment preferably has a total thickness of 1.2±0.2 mm.

In consideration of assortment of optical information recording disc, it is convenient to write or print on each optical recording disc a title or figure representing the recorded information. Therefore, the recording disc preferably has a surface (opposite to the surface exposed to a laser beam) suitable for the representation. Recently, a printing method employing an ink-jet printer has been generally used. In the case that this printing method is adopted, the surface of the recording disc should be hydrophilic because an aqueous ink is used in the ink-jet printer. Since the surface of the recording disc itself generally is hydrophobic, it should be subjected to a surface treatment to form a hydrophilic surface layer so that the aqueous ink may be easily attached and fixed thereon. Japanese Patent Provisional Publications Nos. 7-169700 and 10-162438, for example, disclose an optical information recording medium having a hydrophilic printing surface (hydrophilic surface layer). The hydrophilic surface layer may be provided on the optical information recording disc of the invention. If a hydrophilic resin surface layer is provided as the hydrophilic surface layer, it preferably comprises a UV curable resin (binder) and hydrophilic organic polymer particles (such as protein particles) dispersed therein.

Since a layer (e.g., protective layer) provided under the hydrophilic surface layer is generally transparent, gloss of the reflecting layer can be seen through the layer. In the case that the representation is printed on the surface of the surface layer, the gloss often makes the printed image or the hue of the ink unclear.

To solve this problem, it is effective to intercept the gloss. For example, white or colored (organic or inorganic) pigments may be incorporated into the surface layer. Otherwise, an intercepting layer comprising a binder (e.g., UV curable resin) and the pigments dispersed therein may be provided under the surface layer. These can be adopted in the CD-R and DVD-R of the invention.

For preventing fungus in the hydrophilic surface layer, antiseptics may be incorporated. As the antiseptics, there are no particular restrictions, and those described in Japanese Patent Provisional Publications No. 3-73429 and No. 10-162438 are employable. Typical examples of the antiseptics are benzimidazoles. The antiseptics are usually used in an amount of 0.2 to 2.0 mg based on 1 g of the layer.

The recording/reproducing procedures are carried out, for example, in the following manner.

The CD-R and DVD-R are made to rotate at a predetermined line rate (1.2 to 1.4 m/sec., in the case of CD format) or a predetermined angular velocity. On the rotating disc, a recording light such as a semiconductor laser beam is applied through the transparent substrate. By the application of the laser beam, the irradiated area of the recording layer is heated to change its physical or chemical characteristics.

Thus, pits are formed in the recording dye layer, and thereby the information is recorded. The light source preferably is a semiconductor laser having an oscillation frequency in the range of 500 to 850 nm, specifically 600 to 850 nm. More specifically 700 to 790 nm for CD-R, while 600 to 700 nm for DVD-R. The preferred beam wavelength for DVD-R is in the range of 620 to 680 nm (more preferably, 630 to 660 nm).

For DVD-R, the recording light is preferably focused through an optical system having a NA of 0.55 to 0.7. The minimum recording pit length is usually in the range of 0.05 to 0.7 μm (preferably 0.1 to 0.6 μm, more preferably 0.2 to 0.4 μm).

For reproducing thus recorded information, a semiconductor laser beam having the same wavelength as that used in recording is applied through the transparent substrate onto the CD-R or DVD-R rotating at a predetermined line rate, and the reflected light is detected. Using the optical information recording disc of the invention, the information recording and reproducing procedures can be carried out not only at a normal line rate (in the case of CD format) but also at a more high-speed line rate.

The present invention is further described with the following non-restrictive working examples.

EXAMPLE 1

(1) Preparation of Disc Substrate CD-R

Into an injection machine equipped with a stamper having predetermined pregroove conditions was introduced a polycarbonate resin (Panlight AD5503, available from Teijin Ltd). The molding was carried out at 115° C. to produce a polycarbonate disc substrate. The resulting disc had a diameter of 120 mm, a thickness of 1.2 mm, and had a spiral pregroove on its one surface. The track pitch of the pregroove was 1.6 μm. The pregroove had a radiused top corner on either side. The radius of the radiused top corner continuously increased from an imaginary inner circle having a radius of 30 mm to an imaginary outer circle having a radius of 57 mm, as illustrated in FIG. 3 by Curve A.

The sizes of the formed spiral pregroove are given below.

1) Pregroove on the inner circle (radius: 30 mm)
   Half-width ($W1_{50}$):    500 nm
   Depth (h):    175 nm
   $L1 = (W1_{90} - W1_{50})/2$:    80 nm
2) Pregroove on the outer circle (radius: 57 mm)
   Half-width ($W1_{50}$):    500 nm
   Depth (h):    175 nm
   $L1 = (W1_{90} - W1_{50})/2$:    91 nm (2) Preparation of recording dye layer

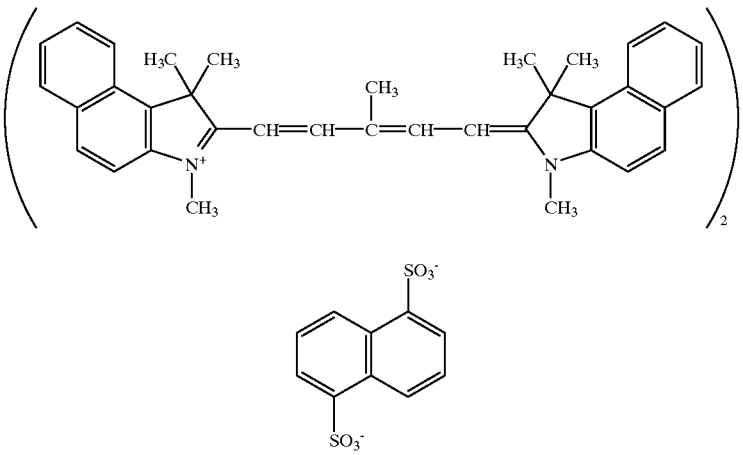

In 100 ml of 2,2,3,3-tetrafluoro-1-propanol was dissolved a cyanine dye of the above-illustrated formula to prepare a coating solution for a recording dye layer. Thus prepared coating solution was then coated by spin-coat on the surface (on which the pregroove was formed) of the above-prepared polycarbonate substrate disc, and dried to give a recording dye layer (thickness: aprrox. 200 nm).

(3) Preparation of Light-reflecting Layer

On the recording dye layer, a light-reflecting layer of Ag (thickness: approx. 100 nm) was provided by sputtering by means of a DC magnetron sputtering apparatus.

(4) Preparation of Protective Layer

A UV curable photopolymer (SD318 [trade name], available from Dainippon Ink & Chemicals, Inc.) was applied by spin-coat (rotation was gradually elevated from 300 to 4,000 rpm) on the light-reflecting layer, and then irradiated with ultraviolet rays to give a protective layer of 8 μm thick.

Thus, an optical information recording disc of CD-R type according to the invention which was composed of a substrate, a recording dye layer, a light-reflecting layer, and a protecting layer overlaid in order was produced.

Comparison Example 1

The procedures of Example 1 for preparing an optical information recording disc of CD-R type were repeated except for replacing the substrate disc with the below-mentioned polycarbonate substrate disc (which was produced from the same material by molding at 120° C.), to prepare an optical information recording disc of CD-R type for comparison.

The resulting disc had a spiral pregroove having a radiused top corner on either side (track pitch: 1.6 μm). The radius of the radiused top corner is same throughout from an imaginary outer circle having a radius of 30 mm to an imaginary inner circle having a radius of 57 mm.

The sizes of the formed spiral pregroove are given below.

Pregroove on the inner and outer circles (radius: 30 mm and 57 mm)

| Half-width ($W1_{50}$): | 500 nm |
|---|---|
| Depth (h): | 175 nm |
| $L1 = (W1_{90} - W1_{50})/2$: | 80 nm |

Evaluation of CD-R (1) On each prepared CD-R, EFM signals to 8 to 16 were recorded using a laser beam of 780 nm (pick-up: NA 0.5) in OMT 2000 (available from Pulse-Tech Co.) at a line rate of 4.8 m/s and a recording power of 3 to 10 mW. The recorded signals were then reproduced using the same laser beam (wavelength: 780 nm, pick-up: NA 0.45) in CD-CATS (Audio Development Co., Ltd.) at a line rate of 1.2 m/s and a laser power of 0.5 mW to measure an 11T land jitter (jitter between pits) on the inner circle having a radius of 30 mm and the outer circle having a radius of 57 mm, by means of TIA (available from Hewlett-Packard Corp.).

The results are set forth in Table 1, in which a smaller jitter value means that uniform signals are formed in the recording disc.

TABLE 1

|  | 11T land jitter (ns) | |
|---|---|---|
|  | On the inner circle | On the outer circle |
| Example 1 | 32 | 33 |
| Com.Ex. 1 | 33 | 37 |

The results shown in Table 1 indicate that the CD-R having the specifically designed groove according to the invention [i.e., Example 1] gives an equal low jitter value, while the CD-R for comparison [i.e., Comparison Example 1] gives a low jitter value in the middle area but gives a high jitter value on the outer periphery.

Example 2
(1) Preparation of Disc Substrate of DVD-R

Into an injection machine equipped with a stamper having predetermined pregroove conditions was introduced a polycarbonate resin (Panlight AD5503, available from Teijin Ltd.). The molding was carried out at 125° C. to produce a polycarbonate disc substrate. The resulting disc had a diameter of 120 mm, a thickness of 0.6 mm, and had a spiral pregroove on its one surface. The track pitch of the pregroove was 0.74 μm. The pregroove had a radiused top corner on either side. The radius of the radiused top corner continuously increased from an imaginary inner circle having a radius of 30 mm to an imaginary outer circle having a radius of 57 mm, as illustrated in FIG. 3 by Curve A.

The sizes of the formed spiral pregroove are given below.

| 1) Pregroove on the inner circle (radius: 30 mm) | |
|---|---|
| Half-width ($W1_{50}$): | 300 nm |
| Depth (h): | 150 nm |

-continued

| $L1 = (W1_{90} - W1_{50})/2$: | 40 nm |
|---|---|
| 2) Pregroove on the outer circle (radius: 57 mm) | |
| Half-width ($W1_{50}$): | 300 nm |
| Depth (h): | 150 nm |
| $L1 = (W1_{90} - W1_{50})/2$: | 60 nm |
| (2) Preparation of recording dye layer | |
| Cyanine dye | |

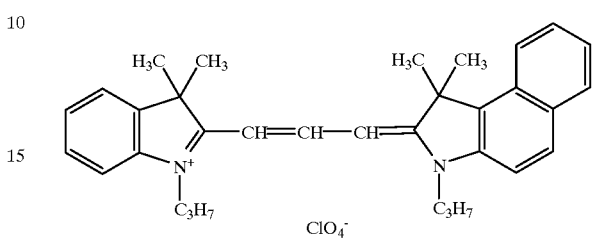

In 100 ml of 2,2,3,3-tetrafluoro-1-propanol was dissolved a cyanine dye of the above-illustrated formula, to prepare a coating solution for a recording dye layer. Thus prepared coating solution was then coated by spin-coat (300 to 2,000 rpm) on the surface (on which the pregroove was formed) of the above-prepared polycarbonate substrate disc, and dried to give a recording dye layer (thickness: approx. 150 nm).
(3) Preparation of Light-reflecting Layer On the recording dye layer, a light-reflecting layer of Ag (thickness: approx. 100 nm) was provided by sputtering by means of a DC magnetron sputtering apparatus.
(4) Preparation of Protective Layer A UV curable photopolymer (SD318 [trade name]) was applied by spin-coat (rotation was gradually elevated from 300 to 4,000 rpm) on the light-reflecting layer, and then irradiated with ultraviolet rays to give a protective layer of 8 μm thick.
(5) Provision of Protective Disc Independently, a protective disc (diameter: 120 mm, thickness: 0.6 mm) of polycarbonate was prepared.

The surface of the disc protective substrate and that of the protective layer of the layered composite were independently coated with a slow UV curable resin (SK7000 [trade name], available from Sony Chemical, Co., Ltd.) by means of screen process printing, so that the resin would be in the form of a layer having a thickness of approx. 10 μm. Each coated surface was exposed to UV light, and immediately the protective substrate and the composition were combined so that the recording layer would be placed inside.

Thus, an optical information recording disc of DVD-R type according to the invention which comprised a substrate, a recording dye layer, a light-reflecting layer, a protecting layer, an adhesive layer, and a protective disc overlaid in order was produced.

Comparison Example 2

The procedures of Example 2 for preparing an optical information recording disc of DVD-R type were repeated except for replacing the substrate disc with the below-mentioned polycarbonate substrate disc (which was produced from the same material by molding at 130° C.), to prepare an optical information recording disc of DVD-R type for comparison.

The resulting disc had a spiral pregroove having a radiused top corner on either side (track pitch: 0.74 μm). The radius of the radiused top corner is same throughout from an imaginary inner circle having a radius of 30 mm to an imaginary outer circle having a radius of 57 mm.

The sizes of the formed spiral pregroove are given below.

Pregroove on the inner and outer circles (radius: 30 mm and 57 mm)

| | |
|---|---|
| Half-width ($W1_{50}$): | 300 nm |
| Depth (h): | 150 nm |
| L1 = ($W1_{90}$ − $W1_{50}$)/2: | 40 nm |

Evaluation of DVD-R (1) On each prepared DVD-R, modulated signals of 8 to 16 were recorded using a laser beam of 635 nm (pick-up: NA 0.60) in OMT 2000 (available from Pulse-Tech Co.) at a line rate of 4.5 m/s and a recording power of 3 to 10 mW. The recorded signals were then reproduced using a laser beam (wavelength: 650 nm, pick-up: NA 0.60) in DDU 1000 (available from Pulse-Tech Co.) at a line rate of 4.5 m/s and a laser power of 0.5 mW to measure a jitter on the inner circle having a radius of 30 mm and the outer circle having a radius of 57 mm, by means of TIA (available from Hewlett-Packard Corp.).

The results are set forth in Table 2, in which a smaller jitter value (%) means that uniform signals are formed in the recording disc.

| | jitter (%) | |
|---|---|---|
| | On the inner circle | On the outer circle |
| Example 2 | 10.5 | 11 |
| Com.Ex. 2 | 10.8 | 14 |

The results shown in Table 2 indicate that the DVD-R having the specifically designed groove according to the invention [i.e., Example 2] gives an equal low jitter value, while the DVD-R for comparison (i.e., Comparison Example 2) gives a low jitter value in the middle area but gives a high jitter value on the outer periphery.

What is claimed is:

1. An optical information recording disc comprising a transparent disc substrate provided with a spiral pregroove, a recording dye layer placed in the pregroove on which information is recorded by irradiation with a laser beam, and a light-reflecting layer, arranged in order, wherein the pregroove formed in the area between an inner circle having a radius corresponding to a half of a radius of the disc substrate and an outer circle having a radius corresponding to 19/20 of the radius of the disc substrate has a radiused top corner at least one side, under the condition that the radius of the radiused corner on the outer circle is more generous than the radius of the radiused corner on the inner circle under the following conditions:

$$W1_{60} - W1_{50} < W2_{90} W2_{30}$$

wherein $W1_{90}$ means a width of the pregroove on the inner circle which is measured at a depth of 10% of the depth of the pregroove and $W1_{50}$ means a half width of the pregroove on the inner circle, while $W2_{90}$ means a width of the pregroove on the outer circle which is measured at a depth of 10% of the depth of the pregroove and $W2_{50}$ means a half width of the pregroove on the outer circle.

2. The optical information recording disc of claim 1, wherein the radius of the radiused corner of the pregroove continuously increases from the pregroove on the inner circle to the pregroove on the outer circle.

3. The optical information recording disc of claim 1, wherein both of the pregroove on the inner circle and the pregroove on the outer circle have a radiused corner on their both sides.

4. The optical information recording disc of claim 1, wherein the recording disc is a recordable compact disc.

5. The optical information recording disc of claim 4, wherein L1 corresponding to ($W1_{90}-W1_{50}$)/2 is in the range of 50 to 120 nm.

6. The optical information recording disc of claim 4, wherein L2 corresponding to ($W2_{90}-W2_{50}$)/2 is in the range of 60 to 130 nm.

7. The optical information recording disc of claim 4, wherein L1 corresponding to ($W1_{90}-W1_{50}$)/2 and L2 corresponding to ($W2_{90}-W2_{50}$)/2 satisfy the following condition:

$$L2-L1=3 \text{ to } 30 \text{ nm.}$$

8. The optical information recording disc of claim 7, wherein L1 and L2 satisfy the following condition:

$$L2-L1=5 \text{ to } 25 \text{ nm.}$$

9. The optical information recording disc of claim 4, wherein the pregroove has a depth of 10 to 300 nm and a half width of 200 to 900 nm.

10. A method of recording information which comprises irradiating a recordable compact disc of claim 4 with a laser beam having a wavelength of 770 to 790 nm.

11. The optical information recording disc of claim 1, wherein the disc is a recordable digital video disc.

12. The optical information recording disc of claim 11, wherein L1 corresponding to ($W1_{90}-W1_{50}$)/2 is in the range of 10 to 100 nm.

13. The optical information recording disc of claim 11, wherein L2 corresponding to ($W2_{90}-W2_{50}$)/2 is in the range of 20 to 110 nm.

14. The optical information recording disc of claim 11, wherein L1 corresponding to ($W1_{90}-W1_{50}$)/2 and L2 corresponding to ($W2_{90}-W2_{50}$)/2 satisfy the following condition:

$$L2-L1=3 \text{ to } 60 \text{ nm.}$$

15. The optical information recording disc of claim 14, wherein L1 and L2 satisfy the following condition:

$$L2-L1=5 \text{ to } 50 \text{ nm.}$$

16. The optical information recording disc of claim 11, wherein the pregroove has a depth of 50 to 250 nm and a half width of 100 to 450 nm.

17. A method of recording information which comprises irradiating a recordable compact disc of claim 11 with a laser beam having a wavelength of 600 to 700 nm.

* * * * *